United States Patent

[11] 3,587,238

| [72] | Inventor | Hans Molly<br>7502 Malsch Kreis Karlsruhe Dr Eugen-Essig-Strasse 48, Germany |
|---|---|---|
| [21] | Appl. No. | 838,428 |
| [22] | Filed | July 2, 1969 |
| [45] | Patented | June 28, 1971 |
| [32] | Priority | July 9, 1970 |
| [33] | | Germany |
| [31] | | P 17 559 12.5 |

[54] POWER-BRANCHED HYDROSTATIC VEHICLE TRANSMISSION
19 Claims, 8 Drawing Figs.

| [52] | U.S. Cl. | 60/53 |
|---|---|---|
| [51] | Int. Cl. | F16d 31/06 |
| [50] | Field of Search | 60/53 (A), 53 |

[56] References Cited
UNITED STATES PATENTS

| 2,389,186 | 11/1945 | Dodge | 60/53A |
|---|---|---|---|
| 2,556,758 | 6/1951 | Haynes et al. | 60/53A |
| 3,718,758 | 9/1955 | Minshall et al. | 60/53A |

*Primary Examiner*—Edgar W. Geoghegan
*Attorney*—Darbo, Robertson and Vandenburgh ABSTRACT: The transmission includes a casing having a main portion and an insert portion releasably connected. The output shaft is carried on spaced bearings in the insert. The output drive gear is between the bearings. On the output shaft, outboard of one bearing, is the housing of a sickle-type gear pump. Within the housing is a ring gear having a pinion inside it. The pinion is concentric with the output shaft and is connected to an input shaft. On the output shaft outboard of the other bearing is the cylinder block of an axial piston motor with the valve member of the motor between the cylinder block and said other bearing. Fluid passages extend through the output shaft between the pump and the motor. The cylinders of the motor have relief passages uncovered by the pistons when the pistons reach the outward extent of their movement. The position of the motor swash plate is controlled by a pair of hydraulic servos on opposite sides of the axis of the output shaft. A pressure operated slide valve to control the servos extends through and beyond the distal end of the output shaft. A control spring in this slide valve has a manual adjustment. The slide valve communicates with the servos through a directional control valve.

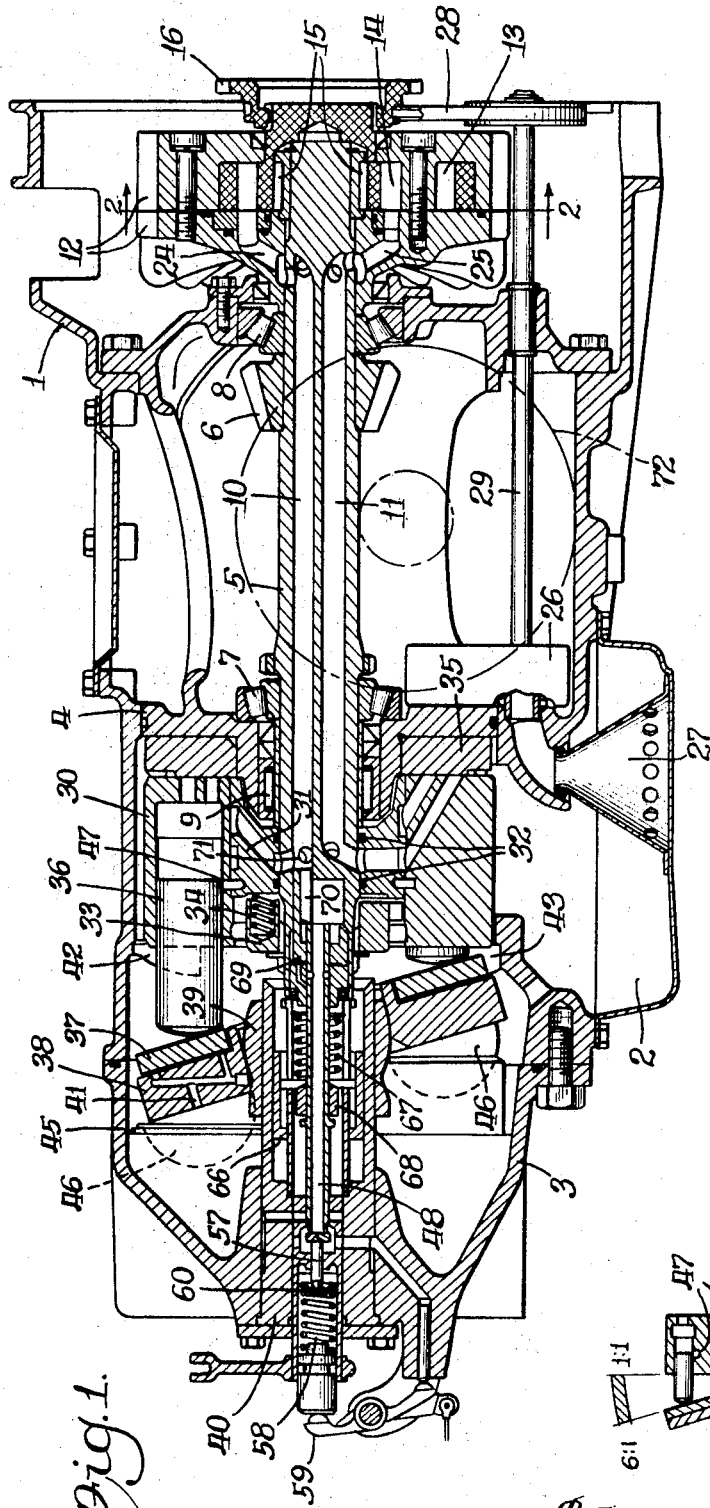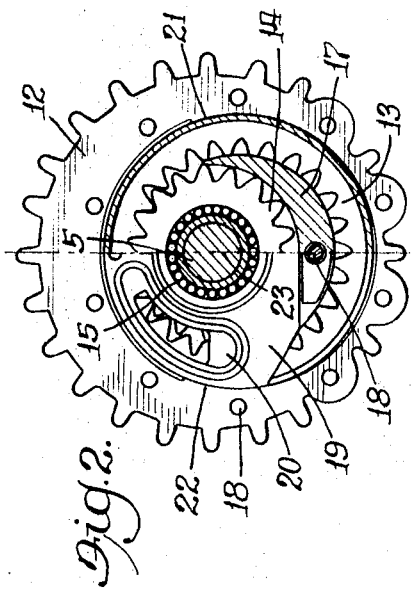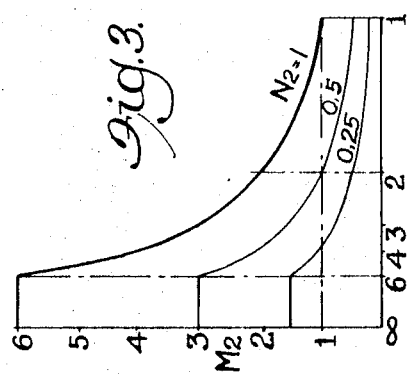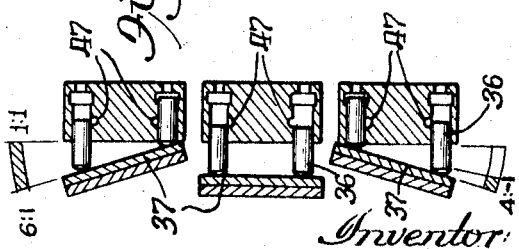
Inventor:
Hans Molly
By: Darbo, Robertson & Vandenburgh
Attys.

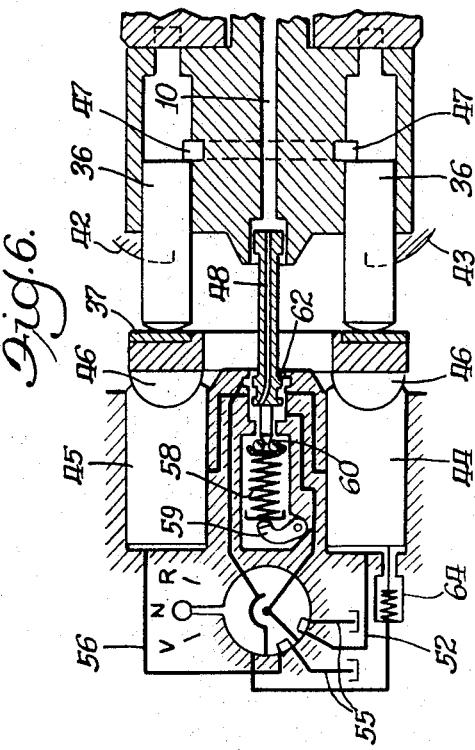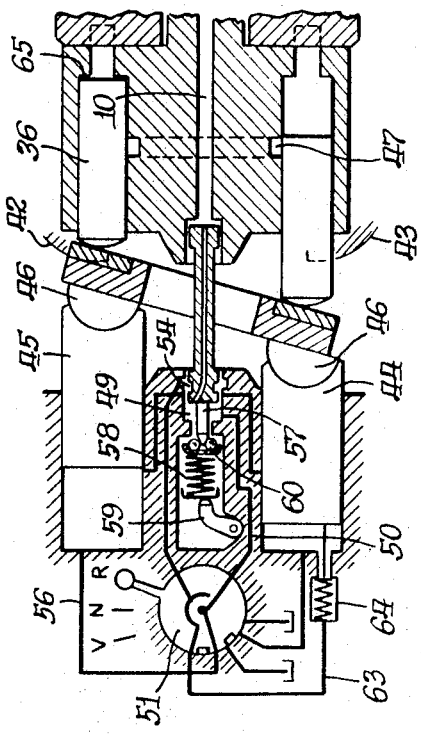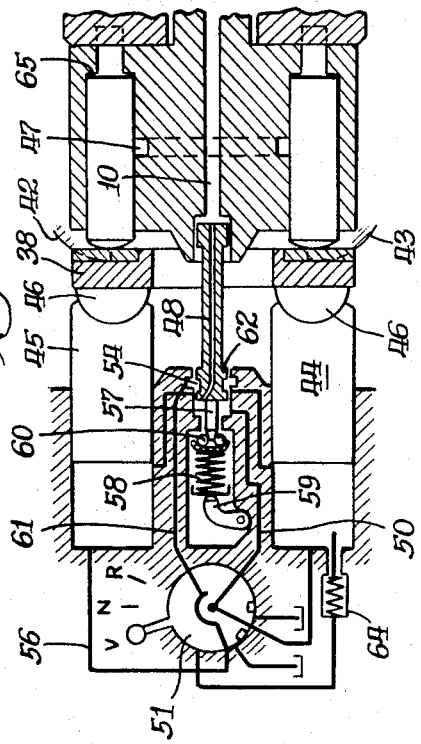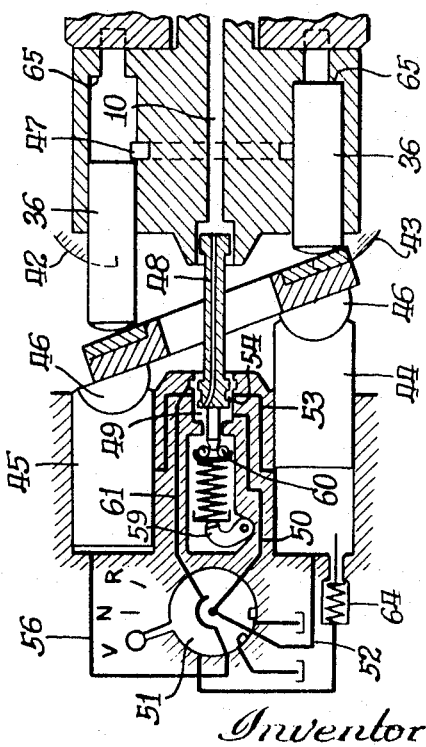

POWER-BRANCHED HYDROSTATIC VEHICLE TRANSMISSION

BACKGROUND OF THE INVENTION

This invention relates to a power-branched hydrostatic vehicle transmission comprising a pump and a stroke-adjustable hydraulic motor hydraulically connected with the pump. The pump and the hydraulic motor each comprise two relatively rotatable machine elements defining oil compartments, one of these elements both of the pump and of the motor being connected with the output shaft, the second machine element of the pump being connected to the input shaft and the second machine element of the motor being held stationary. Hydrostatic drives with power branching are widely known. Power branching offers various advantages to a vehicle. In particular, the interior power branching in which the pump is arranged between the driving unit and the secondary shaft provides a direct transmission in the range of 1:1, so that the inevitable power losses in hydrostatic transmissions can be reduced to a minimum. On the other hand, the advantage of such an arrangement is that the hydraulic motor is variable up to zero stroke—meaning direct speed—, thus allowing that the transmission can operate in the whole range with constant pressure under constant drive power.

An object of the invention is to provide a transmission of this type which requires relatively little space.

Another object of the invention is to provide a transmission of this type such that the motor may be readily opened up for servicing and adjustment. A related more specific object of the invention is to furnish a power-branched hydrostatic vehicle transmission in which the servomechanism for setting the speed and/or direction of operation of the hydraulic motor and the input and output shafts of the transmission do not interfere with each other with respect to their structural arrangement. According to the invention, the pump and the motor of the transmission are spaced on the output shaft; the hydraulic connection between pump and motor is established through channels in the output shaft; the output shaft is journaled in the casing in a pair of bearings between pump and motor; and the power transmitting elements for transmission of power to the vehicle wheels are located between the bearings. Thus, only a relatively short output shaft is provided which is journaled adjacent both ends and the rotary motion of which is taken-off in the center and transmitted to the vehicle wheels, for example, through a hypoid drive. The drive input is at the pump end of the output shaft and the adjustment of the hydraulic motor is made at the motor end of the output shaft, both without interference with the shaft. Furthermore, the structure of the invention is space saving, because special bearings for the hydrostatic drive are not necessary.

It is particularly advantageous, if the pump (located at one end of the output shaft) is a type pump comprising an internal ring gear and a pinion engaging the ring gear. One of the gears is concentric with the input and output shafts and connected to the input shaft. The casing of the pump which surrounds the gears is connected to the output shaft. Such a crescent-type pump can be designed with different numbers of internal gear teeth and pinion teeth such that the harmonic mean value of the two tooth numbers is above 40—60, whereby a good noiseless operation of the pump is achieved. The eccentric gear of the crescent-type pump is eccentric with respect to the axis of rotation of both the input and output shafts and is mounted for limited movement in the direction of the line connecting the gear centers. The concentric gear is connected to the power input. Thereby, engagement of the two gears under the load of centrifugal forces (in addition to that caused by the hydraulic forces) is obtained so that even with considerably varying operative pressures the good volumetric characteristics of the machine are maintained.

The continuous control of such a vehicle transmission makes it necessary that the prime mover be able to vary its rotational speeds quickly, in order to meet the varying requirements of driver and road or traffic conditions. In accordance with the invention the power input of the machine is, therefore, connected to the low-inertia pinion gear of the pump which gear is mounted concentrically to the output shaft so as to take up the centrifugal forces of the eccentric gear.

The hydraulic motor is an axial piston-type motor of which the cylinder block is connected with the output shaft at one end thereof and abuts a valve element, through which the output shaft extends. The tiltable swash plate of said hydraulic motor is mounted on stationary elements, axially in front of the end of the output shaft.

The bearings of the output shaft, the output shaft, the cylinder block of the hydraulic motor, the differential gear for the axle drive, and the pump are mounted in a separate insert of the transmission casing. This assembly can be prepared (or serviced) as a unit and then connected to the main portion of the casing which has the swash plate and some of the control elements. The setup of the whole unit provides for the mounting of the pump and motor outboard of the bearings of the output shaft.

Nonvariable pumps lead to a restriction of the range of drive ratios in the hydraulic transmission. The drive ratio is given by the formula $$i = 1 + \frac{V_2}{V_1}$$

$V_1$ being the delivery volume per revolution of the pump and $V_2$ being the takeup volume per revolution of the motor. If $V_1$ is assumed as a constant quantity and $V_2$ is assumed, for example, as $5 V_1$, a range of drive ratios from $i=1+5=6$ is obtained until, with reduction of the motor takeup volume $V_2$ to zero $i$ becomes $i=1$. Thus the variation of the drive ratio will not be possible up to idling, and, therefore, a continuous variation into reverse drive cannot be achieved. In accordance with a further feature of the invention, provision is therefore made that the cylinder chambers of the motor cylinder block communicate through lateral relief ports which are exposed by the pistons in the maximum outward position thereof. Thus in the maximum outward position of the pistons, fluid under pressure flows from the high-pressure side to the low-pressure side which increases the apparent takeup volume of the motor.

The swash plate is supported in an axial direction on two diametrically opposite actuating members. One of these control members is movable (through the use of a control device) into an end position towards the cylinder block and the other is continuously adjustable within a given range. Both actuating members are retractable in an intermediate state away from the cylinder block in such a manner that the swash plate is perpendicular with respect to the axis of rotation of the output shaft and all pistons expose the lateral relief ports of the cylinders in the cylinder block. In this intermediate position the fluid is merely pumped around through said ports with no torque being exerted on the output shaft by the motor.

For the purpose of centering with respect to the axis of rotation, the swash plate is journaled on a support centered on the axis of rotation and axially movable. Upon forward movement of one of the servo or pilot pistons for the swash plate, a variable forward drive is engaged when the relief ports are closed, while, upon forward movement of the other servo piston the output direction of rotation is reversed. The swash plate can engage respective ones of stationary abutments under the action of the respective servo piston moved into its end position so that, with "forward" and "reverse" drive, there is an off-center support for the swash plate. Thus the servo pistons can be pistons sliding in associated cylinders and being exposed to fluid pressure on one side only. The fluid under pressure applied to the servo pistons on one side of the swash plate acts against the restoring torque exerted on the swash plate by the working piston.

During drive and reverse operation, one of the said servo pistons is under the control of a control slide valve, while the respective other servo piston is moved into its end position by unrestricted fluid under pressure. The control slide valve has a spring which counteracts the system pressure on said control slide valve. The bias of the spring is variable through the power control element. Thus the inclination of the swash plate is adjusted automatically to a value at which the system pressure corresponds to a set value determined by the spring bias. This system pressure, on the other hand, is proportional to the exerted torque and—with given input rotational speed—proportional to the transmitted power.

A shift valve controlled through a shift handle can be provided for the shifting of the servo pistons from "drive" to "reverse" and vice versa. The shift valve has an intermediate "idling" position in which it connects both servo cylinders to sump.

Furthermore, the stroke of the servo piston controlled through the control slide valve during reverse operation can be limited by means of an additional valve which is controlled by the stroke of said servo piston. Thereby, excessive reverse drive speeds are avoided.

In the range of the forward operation, the transmission (as previously mentioned) can be varied between a maximum drive ratio of approximately 6:1 and a drive ratio of 1:1. In the 1:1 position the swash plate is adjusted perpendicular to the axis of rotation and all pistons run in their innermost position without stroke. In this operative position, the compression space below the pistons has been reduced to practically zero. While the cylinder block rotates at full speed, the small residual hydraulic volume at the ends of the pistons is compressed and released once during each revolution. With pressures of 100 atmospheres, this causes a change of volume of about 1 percent, which is effective only on the small volume of the fluid remaining in the valving channels. This is in contrast to a conventional design, in which the total fluid volume at the ends of the pistons remains equal to the takeup volume of the motor through the whole range of adjustment, thus also in the zero stroke position. In contrast to conventional designs, in the transmission of the invention, a 1 percent volume change does not result in appreciable losses, and in addition the valving operation in which the small volume in the channels are merely exposed to pressure and released is effected without noticeable noise. Thus the hydraulic motor in such an arrangement of the invention will ensure high volumetric efficiency and noiseless operation.

In spite of this feature, the operation in direct drive suffers from a reduction of the efficiency due to mechanical losses under load. In order to avoid these losses, provision is made that when the swash plate reaches a position perpendicular to the axis of rotation during drive operation, an additional movement of the control slide valve is caused by a released stop, which movement, in turn, causes movement of a closing slide valve in the high-pressure channel to close a port through which fluid under pressure from the pump flows to the hydraulic motor. Therefore, the closing slide valve becomes effective as soon as the adjustment process tends to exceed 1:1, whereby the connection between pump and hydraulic motor is interrupted and the operating pressure of the pump no longer acts on the hydraulic motor. This is effected as soon as the pressure controller can no longer maintain the desired operating pressure, the latter then dropping below the manually adjusted setpoint. This state of blocking is maintained until the operating pressure again corresponds to the controller setpoint. Thereupon, the control slide valve returns into its operative position and releases the closing slide valve which had interrupted the connection between pump and motor. The control process using reduced drive ratios can, thereby, become freely effective.

DESCRIPTION OF THE DRAWINGS

FIG. 1 is a longitudinal sectional view of a transmission of the invention;

FIG. 2 is a sectional view of the pump as seen transversely to the output shaft in the transmission;

FIG. 3 is a diagram of the secondary torque over the drive ratio for various power parameters;

FIG. 4 illustrates the various operative positions of the swash plate; and

FIG. 5 through FIG. 8 are diagrammatic illustrations showing the servomechanism for the swash plate in the various operative positions.

DESCRIPTION OF SPECIFIC EMBODIMENT

In all drawings, the parts rotating at primary engine speed are cross-hatched. Parts rotating at secondary speed proportional to the axle speed are diagonally hatched with the lines extending downwardly from right to left. Hatching which extends downwardly from left to right to the top left describes all stationary or just sliding parts.

Reference numerals 1 designate generally the casing of the transmission, on which an oil sump 2 is provided. The casing 1 includes a cover 3 and an insert 4, all of which are separable. Cover 3 contains the servo or pilot mechanism for the hydraulic motor. The output shaft 5 is journaled in bearings 7 and 8 mounted in insert 4. A gear 6 of a hypoid drive connected to the vehicle wheels (not shown) is affixed to the output shaft 5. Reference numeral 9 designates a support bearing for the radial forces of the hydraulic motor. A pressure line 10 and a return line 11 between the hydraulic motor and the pump extend through the output shaft 5. The casing 12 of the pump is nonrotatably mounted on the output shaft.

The hydropump is a half moon or sickle-type unit shown in FIG. 2. It contains a ring gear 13 with internal teeth and a gear or pinion 14 with external teeth. Pinion 14 is supported by bearing 15 and rotates concentrical with output shaft 5. It is connected to the combustion engine (not shown) through a flexible coupling 16 to be driven thereby. Ring gear 13 is eccentric with respect to the output shaft 5. Both gears are hydraulically separated by a half moon or sickle member 17. One of the bolts 18 which hold the two housing halves 12 together extends through member 17. A thrust plate 19 ensures self-tightening of the pressure chamber within this half moon type unit and seals the high-pressure space (at the top right in FIG. 2) from the kidney-shaped oil inlet field 20. Freely rotating ring gear 13, is retained on centerline 23 by means of two guidances 21 and 22, and also supports itself with its centrifugal power onto external gear 14 during the rotation of housing 12 at secondary speed.

This play is provided in direction of the centerline 23 so when the oil pressure forces press ring gear 13 against its guidances 21 and 22, the gearing does not press with its full load against the half moon but just touches it in a sealing manner.

Oil lines 24 and 25 guide the oil through housing half 12 into the output shaft passages 10 and 11. A filling pump 26 draws filling oil out of the oil sump 2 through intake 27. The pump is driven from the flexible coupling 16 through a V-belt drive 28 and shaft 29.

Cylinder block 30 of the hydromotor with its oil-line containing housing 31 is slightly flexibly supported on output shaft 5. Sealing rings 32 surround pressure and backflow passages 10 and 11. A coupling piece 33 connects cylinder block 30 and output shaft 5. Pressure spring 34 forces the cylinder block against a valve plate 35.

Depending on the inclination of the swash plate, the valve plate 35 feeds the oil coming from the output shaft 5 to or from the cylinders of the cylinder block. Each cylinder has a piston 36. Pistons 36 each have an external semispherical end which presses against the slideably supported swash plate 37. Swash plate 37 has a tiltable base plate 38 which is guided on pivot 40 through spherical suspension 39. Bores 41 lead oil underneath the rotating swash plate 37. Base plate 38 projects beyond the circular swash plate 37. Depending upon the inclination of the swash plate, base plate 38 bears against cylindrical abutments 42 and 43 forming a part of casing 1. Abutments 42 and 43 have semispherical outer faces which are formed about center points located at the same radial distance from the axis of shaft 5 as are the center points of the semispherical ends of pistons 36. On the opposite side the swash plate contacts the pilot pistons 44 and 45, two of which preferably being provided. At their ends the pilot pistons carry semispherical supports 46.

FIG. 4 shows the three basic positions of the swash plate: Position "Forward Drive" showing one piston 36 in its top dead center in which position it just opens slot 47 connecting suction and pressure side so that a ratio beyond 6:1 causes idling. The other piston 36 is in its bottom dead center position. Position "Stop" shows the swash plate 37 at right angles to the axis of rotation of the cylinder block, in such a way that all pistons 36 open the slots 47, causing idling and, in addition, that no torque from the hydraulic motor acts onto the output shaft 5. Position "Reverse Drive" shows swash plate 37 in its opposite inclination still leaving slot 47 open so that upon a slight further inclination the reverse operation can start.

FIGS. 5, 6 and 7 show how the swash plate 37 is adjusted to the three positions for forward drive, stop, and reverse drive respectively. FIG. 8 shows the position at direct drive.

In FIG. 5, pressure oil from line 10 passes through control piston 48 (of the slide control valve) and reaches chamber 49. From chamber 49 it is carried through line 50 to a rotary directional valve 51. Position "V" (forward) of the rotary valve admits the oil into line 52 leading to the cylinder of pilot piston 44. Piston 44 is thereby pushed into its outer stroke position and presses base plate 38 against abutment 43. At this position, piston 44 uncovers line 53 to admit the pressure oil into ring groove 54 of the control piston 48, which now can start its operation as subsequently described.

FIG. 6 shows the rotary directional valve in position "N". Pressure oil coming from chamber 49 cannot flow beyond valve 51. The cylinders of pistons 44 and 45 are emptied through lines 52, 56, and 55 so that the swash plate takes up the neutral position as shown, in which all pistons 36 open the slots 47. This process is assisted by the oil pressure forces of the transmission acting upon the pistons 36.

A process similar to FIG. 5 is shown in FIG. 7. The rotary slide valve 51 is turned to "R" (reverse). Oil from chamber 49 flows through line 50 to rotary slide valve 51. This oil then flows into line 56 to the cylinder of pilot piston 45. Piston 45 is moved into its end position, in which position base plate 38 is pressed against abutment 42. The hydromotor is ready to reverse.

FIGS. 5, 6, 7, 8 and 1 show the control piston 48 with piston 57, the cross-sectional area of which is the connecting member between oil pressure of line 10 and tension of control spring 58. This spring can be adjusted manually by means of a lever 59. For low friction, piston 57 is supported through a ball or roller bearing 60 against the spring so that sensitive reaction to spring tension is ensured.

Referring to FIG. 5, as soon as the spring force exceeds the resultant force created by the existing oil pressure on piston 48, ring groove 54 moves to the right and admits pressure oil from line 53 into line 61. From line 61 the oil can pass through rotary slide valve 51 into line 56 and the cylinder of piston 45. Pilot piston 45 moves forward until the increasing pressure in line 10 acting on the cross section of the slide valve reaches balance with the control spring 58. Thereupon, the slide valve moves to the left so that the abutment on the side of ring groove 54 closes line 53. Further increase of oil pressure in line 10 causes control piston 48 to move further to the left and oil trapped in line 56 to draw off past collar 62. This process ends as soon as the swash plate has reached full operating angle at ratio $i$=6:1, before slots 47 open if overload occurs.

At decreasing operating pressure, pilot piston 45 then comes to a position shown in FIG. 8, in which base plate 38 is pressed against the abutment 42. Compression chamber 65 now causes a minimum of loss and noise during the commutation of the oil in the valve plate 35.

FIG. 1 also demonstrates the behavior of control piston 48 when pressure further decreases in the above-mentioned 1:1 position, for instance in driving downhill or at lower rolling resistance. The spherical suspension 39 has been carried along to the right by base plate 38, and thus pushed sleeve 66 forward on pivot 40. Accordingly, sleeve 66 carries stop 68 of the control piston along against a spring 67, so that a piston valve 69 with its spoon-type extension 70 covers opening 71 in the main line 10. The hydromotor now remains pressureless as long as the oil pressure is lower than the preset value given by control spring 58. The machine operates with the pump in short circuit connection and the hydromotor idling under best mechanical and hydraulic values.

Returning of the control piston 48 under increasing oil pressure removes first the piston valve 69 with its spoon-type extension 70 from opening 71 and then starts the normal control operation of the pilot pistons 45.

FIG. 7 showing the position for reverse movement. The pressure oil comes through lines 61, 63 and check valve 64, and enters the cylinder of piston 44. Thereby piston 44 is moved forward until it releases the actuating member of check valve 64 to allow the check valve to close the circuit. In this position the control process for the reverse speed range is stopped; too fast reverse speeds are avoided, which otherwise could be adjusted to infinity at $-V_r=+V_1$.

ASSEMBLY OF THE TRANSMISSION

The four pilot pistons 44 and 45 are inserted in cover 3, along with the pivot 40 containing the manual lever system for "Forward", "Stop", "Reverse" and the control piston insert with opening for piston 57. The swash plate 37, together with its base plate 38 seating on the spherical suspension 39, is mounted on pivot 40. Cover 3 is mounted on housing 1 which already carries oil sump 2 and funnel tube 27.

Output shaft 5 with hypoid gear 6 and the parts of the differential to be assembled and adjusted are mounted within special insert 4. Then the pump is completed on one side of the output shaft and the cylinder block with pistons on the other side. Filling pump 26 with its V-belt drive 28 is mounted on the special insert 4.

After these preparations the special insert 4 can be inserted into the housing 1, the transmission thus being complete.

OPERATION OF THE TRANSMISSION

Irrespective of the setting, i.e. "Forward", "Stop", or "Reverse", of the directional control valve, the vehicle engine can be started. The filling pump 26 then draws oil from the oil sump 2 and feeds it into the circuit of the transmission. Initially, lines 10 and 11 will slowly fill until filling pressure is reached and oil gets through the boring in control piston 48 into line 50. From line 50 the oil, depending on the position of preselection lever, if fed to the pilot pistons 44 or 45.

Through lever 59, the tension of control spring 58 is adjusted. Control spring 58 pressing against piston 57, thus brings filling pressure onto one of the preselected pilot pistons 44 or 45 while no counter pressure exists in line 10. Upon having passed by the slots 47, the pistons 36 will bring the vehicle to operation. The existing rolling resistance will then accordingly create oil pressure in line 10 which is in counterbalance to the force of spring 58. Too high torque resistance on the rear axle will increase the pressure in line 10 and the pressure oil will be released from the chambers of the pilot piston 45, lines 56 and 61, past collar 62 until the swash plate has reached the angle necessary to overcome the torque at the rear axle at the preset oil pressure. Should the angle become too great, the slots 47 will open and the vehicle will come to the condition of start until the wheels stop.

At maximum ratio of 6:1, the traction limit of the wheels has already been exceeded so that the full operation pressure cannot develop in line 10. Therefore, slots 47 will open only at lower control spring settings achieved by means of the lever 59.

Complete retraction of lever 59 will result in idling. The slots 47 are fully open at bottom dead center position of the pistons. Selection of "neutral" or "stop" position, however, returns both pistons 45 and 44 and reaches a state of zero motor torque in which, moreover, the circuit of the idling pump can freely circulate through slots 47 which are opened by all pistons. The vehicle will remain in its "stop" position without significant crawling.

At "reverse" position as shown in FIG. 7, the pilot piston 45 will be supplied with pressure oil from lines 50, 56, and will be pushed forward. In accelerating, pressure oil will be fed through lines 61, 63 into the piston 44, as long as the spring loaded check valve 64 with its actuating member rests against the piston. FIG. 7 shows the end position at which the connection from line 63 to the chamber of pilot piston 44 is interrupted, thus stopping the reverse drive at a ratio of between 4:—1 and 3:—1.

In forward direct speed, the base plate 38 comes to lean against the abutments 42 and 43, so that exact direct transmission is ensured with the pistons running strokeless in their top stroke position. The driver will not realize that at further decrease of the operating pressure in line 10 the spoon-type extension 70 will slide over the opening 71 so that the hydraulic motor becomes pressureless.

Due to the very high sealing quality of half moon or sickle-type gear pumps, the behavior of this transmission is practically similar to directly coupled drives.

If the operating pressure in line 10 increases in uphill driving, or if the driver actuates lever 59 thus releasing control spring 58, the control piston 48 will move to the left and return spoon 70 so that the normal state is reached again. Any of the above-mentioned processes are automatic and under the influence of control spring 58, the tension of which can be changed by the driver depending on the requirements.

FIG. 3 shows the varying torque requirements as hyperbolas for various efficiencies $N_2$. The secondary torque $M_2$ increases accordingly from 1 to 6, of course under consideration of possible efficiency decreases. Each shown power value has its constant oil pressure of 1, 0.5 or 0.25 of the maximum operating pressure at full load.

I claim:

1. In a power-branched hydrostatic transmission for a vehicle, wherein the transmission includes an input shaft to which power is delivered to the transmission, an output shaft having an output connection from which power is delivered from the transmission to drive the vehicle, a casing, bearing means rotatably supporting said output shaft in said casing, a stroke-adjustable hydraulic motor comprising two relatively rotatable machine elements one of which is operatively connected to the casing and the other of which is operatively connected to the output shaft, a hydraulic pump comprising two relatively rotatable machine elements one of which is operatively connected to the input shaft and the other of which is operatively connected to the output shaft, and hydraulic fluid passages connecting the pump and motor through one of which passages hydraulic fluid is delivered from said pump to said motor, the improvement comprising:

said bearing means comprising a pair of bearings spaced apart with a first portion of said output shaft being between the spaced bearings, a second portion of the output shaft being outboard of one bearing and a third portion of the output shaft being outboard of the other bearing, said other element of the pump being connected to said second portion, said other element of the motor being connected to said third portion, said output connection of said output shaft being made at said first portion of said shaft; and said shaft having a channel extending longitudinally through said first portion and into said second and third portions, said channel forming a part of the passage through which hydraulic fluid is delivered from said pump to said motor.

2. In a transmission as set forth in claim 1, wherein said pump is a crescent pump comprising: a casing at the distal end of said second portion of the output shaft and connected thereto, said casing having a cavity therein; a ring gear with internal teeth within said casing; and a pinion gear within said ring gear and having teeth engaging said internal teeth, one of said gears being concentric with said output shaft and connected to said input shaft, the other of said gears being eccentric to said output shaft.

3. In a transmission as set forth in claim 2, wherein said motor is an axial piston-type motor comprising a cylinder block, a valve member and a tiltable swash plate, said cylinder block being connected to said third portion for rotation therewith about a common axis, said cylinder block having one side adjacent said other bearing and a second side opposite said one side, said valve member being about said output shaft between said cylinder block and said other bearing and in contact with said one side, said swash plate being beyond said other side of said cylinder block, and stationary means connected to said casing and supporting said swash plate.

4. In a transmission as set forth in claim 3, wherein said motor includes power pistons, said cylinder block has cylinder chambers to receive said pistons and has lateral ports communicating with the respective chambers, said ports being positioned to be covered by the pistons during that portion of the piston stroke up to the maximum outward movement of the piston in its chamber and to be uncovered upon the piston reaching said maximum stroke.

5. In a transmission as set forth in claim 4, wherein said motor includes actuating means for controlling the position of said swash plate and positioned between the swash plate and the casing, said actuating means including a pair of actuating members positioned on opposite sides of said axis and movable individually toward and away from said axis so that optionally the swash plate may be inclined with respect to said axis, held at right angles to the axis, and may be moved along said axis toward and away from said cylinder block.

6. In a transmission as set forth in claim 5, wherein said casing includes abutment means positioned in the path of movement of the swash plate to intercept the swash plate and limit the maximum inclination of the swash plate.

7. In a transmission as set forth in clam 6, wherein said actuating means includes two servos each forming one of said actuating members respectively, each of said servos having a cylinder mounted on said casing, and a piston in the cylinder, movable along a line parallel to said axis.

8. In a transmission as set forth in claim 7, including control means for said servos to regulate the position of the swash plate, said control means including first valve means and second valve means, said first valve means comprising a slide valve having a slide, a spring urging the slide in one direction and means for varying the pressure of the spring in so urging said slide, said slide valve communicating with said passage so that the pressure of the hydraulic fluid in said passage urges the slide in the opposite direction, said slide valve having a passageway which is exposed to said hydraulic fluid pressure when the slide is moved by the hydraulic fluid to a given extent, said second valve means communicating with said passageway and with the two servo cylinders, and including movable means having two positions for respectively placing said passageway in communication with one servo cylinder for forward operation and with the other servo cylinder for reverse operation.

9. In a transmission as set forth in claim 8 including a sump and wherein said second valve has a third, intermediate idle position at which the two servo cylinders are connected to the sump.

10. In a transmission as set forth in claim 2, wherein each of said gears has a center with the centers being spaced apart along a line, said eccentric gear being movable in a direction such that its center will move along said line to a limited extent.

11. In a transmission as set forth in claim 1, wherein said motor is an axial piston type motor comprising a cylinder block, a valve member and a tiltable swash plate, said cylinder block being connected to said third portion for rotation therewith about a common axis, said cylinder block having one side adjacent said other bearing and a second side opposite said one side, said valve member being about said output shaft between said cylinder block and said other bearing and in contact with said one side, said swash plate being beyond said other side of said cylinder block, and stationary means connected to said casing and supporting said swash plate.

12. In a transmission as set forth in claim 11, wherein said motor includes power pistons, said cylinder block has cylinder chambers to receive said pistons and has lateral ports communicating with the respective chambers, said ports being positioned to be covered by the pistons during that portion of the piston stroke up to the maximum outward movement of the piston in its chamber and to be uncovered upon the piston reaching said maximum stroke.

13. In a transmission as set forth in claim 12, wherein said motor includes actuating means for controlling the position of said swash plate and positioned between the swash plate and the casing, said actuating means includes a pair of actuating members positioned on opposite sides of said axis and movable individually toward and away from said axis so that optionally the swash plate may be inclined with respect to said axis, held at right angles to the axis, and may be moved along said axis toward and away from said cylinder block.

14. In a transmission as set forth in claim 13, wherein said actuating means includes two servos each forming one of said actuating members respectively, each of said servos having a cylinder mounted on said casing, and a piston in the cylinder, movable along a line parallel to said axis.

15. In a transmission as set forth in claim 14, wherein:
each of said power pistons is movable along a respective path and has an external semispherical head formed about a center of curvature, said casing includes a pair of abutments having curved heads formed about a center of curvature,
said abutment heads being positioned to intercept the swash plate as its positions of greatest inclination and to prevent further inclination of the swash plate,
said centers of curvature all being at the same radial distance from said axis.

16. In a transmission as set forth in claim 14, including control means for said servos to regulate the position of the swash plate, said control means including first valve means and second valve means, said first valve means comprising a slide valve having a slide, a spring urging the slide in one direction and means for varying the pressure of the spring in so urging said slide, said slide valve communicating with said passage so that the pressure of the hydraulic fluid in said passage urges the slide in the opposite direction, said slide valve having a passageway which is exposed to said hydraulic fluid pressure when the slide is moved by the hydraulic fluid to a given extent, said second valve means communicating with said passageway and with the two servo cylinders, and including movable means having two positions for respectively placing said passageway in communication with one servo cylinder for forward operation and with the other servo cylinder for reverse operation.

17. In a transmission as set forth in claim 16, wherein said control means includes a third valve communicating with said one servo cylinder and with said second valve, the second valve supplying hydraulic fluid under pressure to said third valve means when said second valve is in the position for reverse operation, said third valve means having a valve actuating member operatively associated with the servo piston of said one servo cylinder for controlling the operation of the third valve means in response to the position of the servo piston, said third valve means being closed except when the servo piston of said one servo cylinder reaches a point corresponding to maximum inclination of the swash plate during reverse operation and being open when the swash plate reaches said maximum inclination during reverse operation.

18. In a transmission as set forth in claim 16, including pressure control valve means responsive to the pressure in said passage to close off the fluid to the motor when the pressure in said passage drops below a predetermined value.

19. In a transmission as set forth in claim 1, wherein the casing includes a main part and an insert part releasably connected together, and said motor includes a cylinder block; said cylinder block, said pump, said output shaft with said output connection and said spaced bearings all being mounted on said insert part whereby it may be assembled as a unit and removed as a unit for servicing.